US008416464B2

(12) United States Patent
Harada

(10) Patent No.: US 8,416,464 B2
(45) Date of Patent: Apr. 9, 2013

(54) DOCUMENT PROCESSING APPARATUS AND DOCUMENT PROCESSING METHOD

(75) Inventor: Koji Harada, Yokohama (JP)

(73) Assignee: Canon Kabushiki Kaisha (JP)

( * ) Notice: Subject to any disclaimer, the term of this patent is extended or adjusted under 35 U.S.C. 154(b) by 785 days.

(21) Appl. No.: 12/604,475

(22) Filed: Oct. 23, 2009

(65) Prior Publication Data

US 2010/0103470 A1   Apr. 29, 2010

(30) Foreign Application Priority Data

Oct. 24, 2008  (JP) ................................ 2008-274867
Jul. 28, 2009  (JP) ................................ 2009-175800

(51) Int. Cl.
*H04N 1/40* (2006.01)

(52) U.S. Cl.
USPC ........................................ 358/3.28; 358/468

(58) Field of Classification Search ................ 358/3.28, 358/1.9, 2.1, 468, 400, 500, 1.2, 1.18
See application file for complete search history.

(56) References Cited

U.S. PATENT DOCUMENTS

| 4,998,626 | A | 3/1991 | Ota | |
| 7,039,215 | B2 * | 5/2006 | Suzaki | 382/100 |
| 8,064,103 | B2 * | 11/2011 | Harada | 358/3.28 |
| 2004/0001606 | A1 | 1/2004 | Levy | |
| 2004/0093498 | A1 | 5/2004 | Noridomi et al. | |
| 2005/0039021 | A1 | 2/2005 | Alattar et al. | |
| 2010/0103470 | A1 | 4/2010 | Harada | |

FOREIGN PATENT DOCUMENTS

JP   2002-232679 A   8/2002

OTHER PUBLICATIONS

Specification and drawings of unpublished U.S. Appl. No. 12/604,461, filed Oct. 23, 2009, "Document Processing Apparatus and Document Processing Method", Koji Harada, pp. 1-58.
Specification and drawings of unpublished U.S. Appl. No. 12/604,483, filed Oct. 23, 2009 "Document Processing Apparatus and Document Processing Method", Masanori Yokoi, pp. 1-52.
"Fundamentals of Digital Watermarking—New Technology for Protection of Multimedia Contents," Kineo Matsui, Morikita Publishing Co., Ltd., p. 198-p. 199, (Partial English translation).

* cited by examiner

*Primary Examiner* — Thomas D Lee
*Assistant Examiner* — Stephen M Brinich
(74) *Attorney, Agent, or Firm* — Rossi, Kimms & McDowell LLP

(57) ABSTRACT

Line spacing values in a document image are extracted and a variance is calculated for fluctuations in the line spacing values. When the calculated variance is higher than a preset threshold value, the document image is determined as having watermark information embedded therein. Such use of the variance in the line spacing values enables high-speed determination of the presence or absence of line-spacing watermark information. At this time, it is possible to speed up the determination by using only some line spacing values in the document, instead of using all line spacing values.

15 Claims, 9 Drawing Sheets

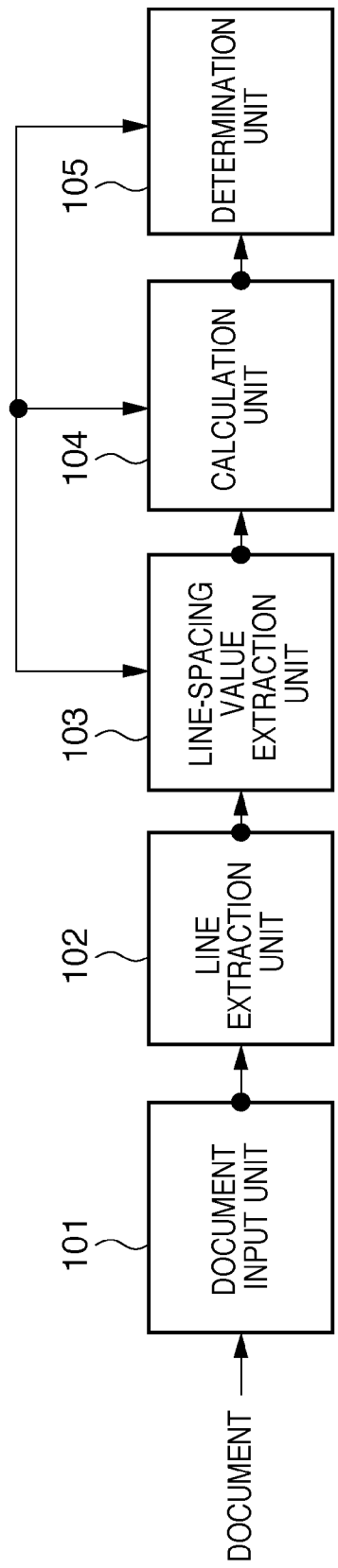

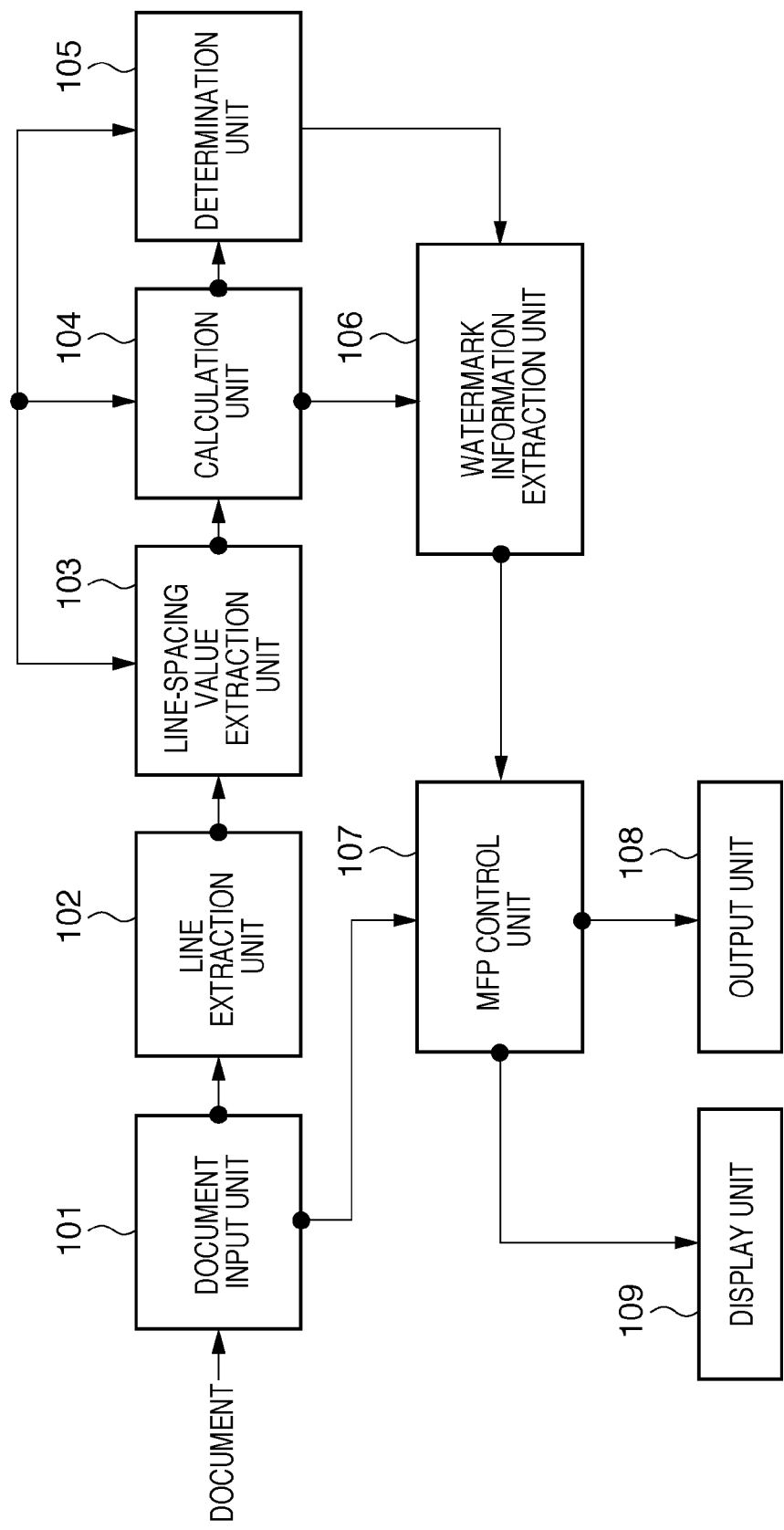

FIG. 4

WATERMARKED DOCUMENT

| LINE SPACING VALUE | DEVIATION | SQUARE OF DEVIATION |
|---:|---:|---:|
| 139 | −10.00 | 100.00 |
| 159 | 10.00 | 100.00 |
| 158 | 9.00 | 81.00 |
| 140 | −9.00 | 81.00 |
| AVERAGE Ave: 149 | VARIANCE V: | 90.50 |

FIG. 5

ORDINARY DOCUMENT

| LINE SPACING VALUE | DEVIATION | SQUARE OF DEVIATION |
|---:|---:|---:|
| 153 | 2.00 | 4.00 |
| 152 | 1.00 | 1.00 |
| 150 | −1.00 | 1.00 |
| 149 | −2.00 | 4.00 |
| AVERAGE Ave: 151 | VARIANCE V: | 2.50 |

FIG. 7

WATERMARKED DOCUMENT

| LINE SPACING VALUE | DEVIATION | SQUARE OF DEVIATION | | |
|---|---|---|---|---|
| 148 | −2.00 | 4.00 | 6.50 | VARIANCE V1 |
| 152 | 2.00 | 4.00 | 7.00 | VARIANCE V2 |
| 147 | −3.00 | 9.00 | 8.50 | VARIANCE V3 |
| 153 | 3.00 | 9.00 | 9.57 | VARIANCE V4 |
| 153 | 3.00 | 9.00 | 11.50 | VARIANCE V5 |
| 146 | −4.00 | 16.00 | | |
| 154 | 4.00 | 16.00 | | |
| 145 | −5.00 | 25.00 | | |

AVERAGE Ave: 150

DOCUMENT PROCESSING APPARATUS AND DOCUMENT PROCESSING METHOD

BACKGROUND OF THE INVENTION

1. Field of the Invention

The present invention relates to a document processing apparatus and a document processing method, and in particular relates to a document processing apparatus that determines whether or not a document image has watermark information embedded therein by the use of line spacing, and a document processing method therefor.

2. Description of the Related Art

In order to invisibly include information such as copyright notices or copy restrictions in a document image, methods for embedding information by slightly changing line spacing have been well-known (e.g., Kineo Matsui, "Fundamentals of Digital Watermarking-New Technology for Protection of Multimedia Contents," Morikita Publishing Co., Ltd., p 198-p 199). Hereinafter, such information that has been embedded by the use of line spacing is referred to as a line-spacing watermark.

As an example of information embedding rules using line spacing, for example, two adjacent line spaces are sequentially set as a single pair, and in each pair, either "0" or "1" is defined according to the sizes of the line spaces. Such a data string of "1"s and "0"s represents a line-spacing watermark.

In one example of the method for extracting such a line-spacing watermark embedded in a document image, as a first step to extract line spaces, an entire document image is scanned so as to obtain a histogram in a sub-scanning direction and then line spaces are calculated based on this histogram. Thereafter, the sizes of the calculated line spacing values are determined for each pair so as to define whether the information is "0" or "1" according to the rules used at the time of embedding, then the presence or absence of watermark information is determined based on a data string of such information, and when it is determined that watermark information is present, the information is extracted.

Such a line-spacing watermark is used in a copying machine, for example. Specifically, line-spacing watermark information embedded in a document to be copied is extracted and whether or not copying is allowed is controlled according to the contents of the information.

However, in the above-described conventional line-spacing watermark embedding method, since line spacing is measured at the time of its extraction, the presence or absence of watermark information can be determined only after obtaining a histogram via a scan of an entire document image and then extracting a data string of "0"s and "1"s. For this reason, it takes considerable processing time to determine the presence or absence of watermark information.

For example, in the case where a copying machine controls copy permission based on watermark information, it is required to determine the presence or absence of watermark information in as short a time as possible in order to prevent a delay from occurring in a series of copy operations.

SUMMARY OF THE INVENTION

The present invention has been made in view of the above-described problems and provides a document processing apparatus that enables high-speed determination of the presence or absence of line-spacing watermark information in a document image, and an image processing method therefor.

According to the first aspect of the present invention, a document processing apparatus that determines whether or not a document image has watermark information embedded therein by use of line spacing, comprises: an input unit adapted to input a document image; a line-spacing value extraction unit adapted to extract line spacing values in the document image; a calculation unit adapted to calculate fluctuations in the line spacing values; and a determination unit adapted to determine whether or not the document image has watermark information embedded therein by comparing the value of the fluctuations calculated by the calculation unit with a preset threshold value.

According to the second aspect of the present invention, a document processing method for determining whether or not a document image has watermark information embedded therein by use of line spacing, comprises: an input step of inputting a document image; a line-spacing value extraction step of extracting line spacing values in the document image; a calculation step of calculating fluctuations in the line spacing values; and a determination step of determining whether or not the document image has watermark information embedded therein by comparing a value of the fluctuations calculated in the calculation step with a preset threshold value.

Further features of the present invention will be apparent from the following description of exemplary embodiments with reference to the attached drawings.

BRIEF DESCRIPTION OF THE DRAWINGS

FIGS. 1A and 1B are block diagrams illustrating a fundamental functional configuration of a document processing apparatus according to first to third embodiments of the present invention.

FIG. 4 is a diagram illustrating an example of the calculation of fluctuations in a watermarked document according to the first embodiment.

FIG. 5 is a diagram illustrating an example of the calculation of fluctuations in an ordinary document according to the first embodiment.

FIG. 7 is a diagram illustrating an example of the calculation of fluctuations in a watermarked document according to the second embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 3:
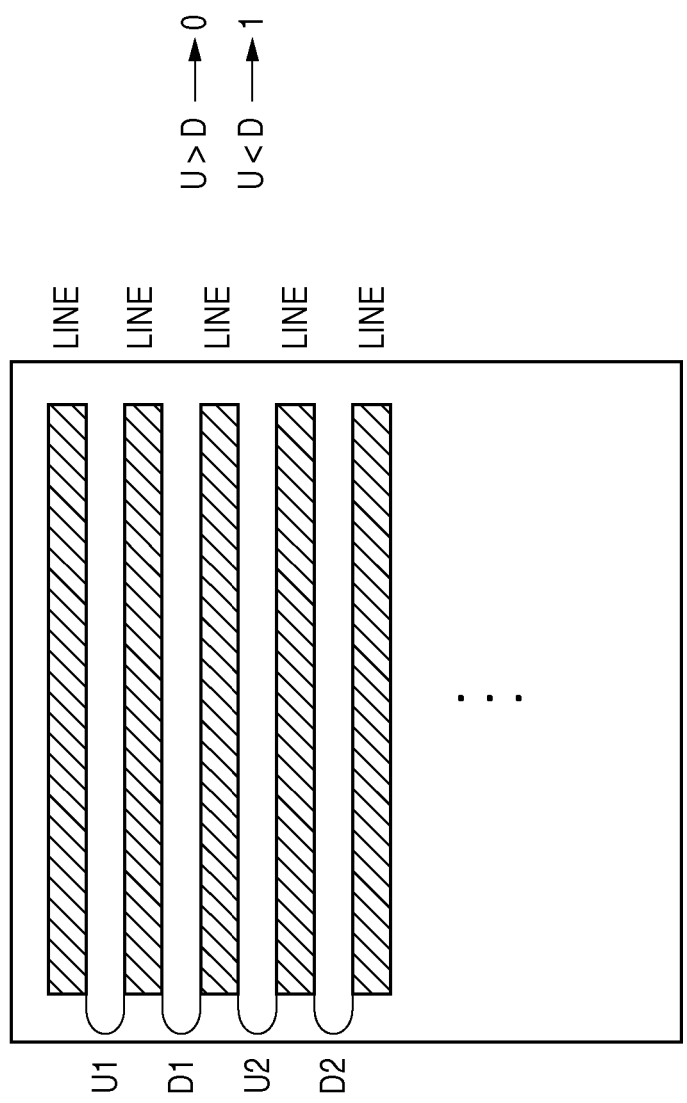
FIG. 3 is a diagram illustrating an example of a document that has line-spacing watermark information embedded therein.

The present embodiment has the feature that it enables high-speed determination of whether or not a document image has line-spacing watermark information embedded therein by the use of line spacing. FIG. 3 illustrates an example where line-spacing watermark information, which is a subject of the determination according to the present embodiment, has been embedded. Referring to FIG. 3, line spaces U and D are controlled so that U>D when "0"s of binary information are to be embedded, and so that U<D when "1"s are to be embedded. The present embodiment enables high-speed determination of the presence or absence of a line-spacing watermark as illustrated in FIG. 3 in a document image to be processed.

FIG. 1A is a block diagram illustrating a fundamental functional configuration of a document processing apparatus according to the present embodiment. As illustrated in FIG. 1A, a document processing apparatus according to the present embodiment includes a document input unit 101, a line extraction unit 102, a line-spacing value extraction unit 103, a calculation unit 104, and a determination unit 105. The document input unit 101 inputs a document image that is not limited to an image printed on recording paper or an electronic image (such as a PDF file). The line extraction unit 102 extracts only line portions from the input document image. The line-spacing value extraction unit 103 extracts a line spacing value between lines. The calculation unit 104 calculates fluctuations in the extracted line spacing values. The determination unit 105 determines the presence or absence of watermark information based on the calculation result.

Figure 2:
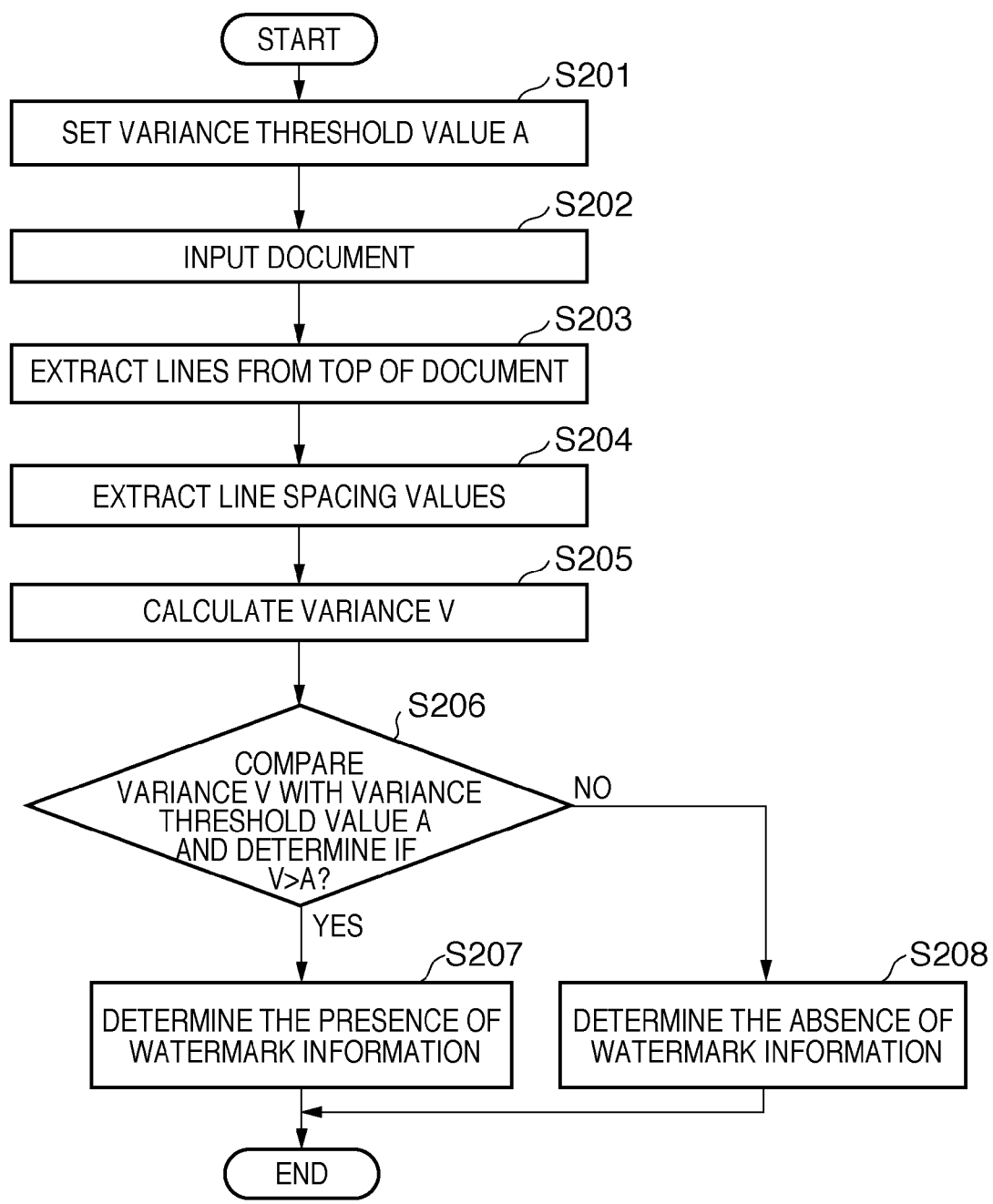
FIG. 2 is a flow chart illustrating a process for determining the presence or absence of line-spacing watermark information according to the first embodiment.

The following describes the process for determining the presence or absence of line-spacing watermark information performed by the document processing apparatus according to the present embodiment with reference to the flow chart in FIG. 2.

First, in step S201, the determination unit 105 sets a variance threshold value A that is used to determine whether or not a document image includes watermark information. This variance threshold value A may be held in the determination unit 105; in the present example, the variance threshold value A shall be 50.

Then, in step S202, the document input unit 101 inputs a document image as a document and transmits the input document image as document data I to the line extraction unit 102. Note that, in the case where the document image is a paper document, the document input unit 101 inputs the document image using a reading unit such as a charge coupled device (CCD) or an optical sensor. The document input unit 101 generates document data I through processing performed by the reading unit, such as document image capture, electric signal processing, or digital signal processing, according to an image input instruction. In the case where the document data I is processed in a data format such as PDF in the document processing apparatus, the document input unit 101 processes the document data I in that data format.

Then, in step S203, the line extraction unit 102 extracts line portions from the document data I. Thereafter, in step S204, the line-spacing value extraction unit 103 sequentially extracts line spacing values for the extracted lines. At this time, it is not necessary to extract all lines and all line spacing values in the document data I; for enhanced speed, a predetermined number of lines to be extracted and a corresponding number of line spacing values to be extracted may be set in advance.

Note that, since the line-spacing watermark information to be extracted according to the present embodiment has been embedded according to the sizes of two line spaces, it is necessary to acquire a total of N pairs of line spacing values, each pair consisting of two line spacing values, that is, to acquire 2N line spacing values. In other words, the number of line spacing values to be acquired is a multiple of two, and two is the minimum number of line spacing values. To simplify the description, the following describes the case of extracting four line spacing values.

In the present embodiment, a "line spacing value" may be defined as a height of a blank portion between character string lines or may be a sum of a height of a single character string line and a height of a blank portion; it may be defined as appropriate in view of the processing performed in the apparatus.

After, as described above, the line spacing values have been extracted in step S204, then in step S205, the calculation unit 104 calculates fluctuations in the line spacing values.

The following describes a specific example of the calculation of fluctuations according to the present embodiment. In the present embodiment, a variance is used for the calculation of fluctuations; the following describes an example of the calculation of a variance depending on the presence or absence of a line-spacing watermark.

FIG. 4 illustrates an example of the calculation of a variance in a document image that has a line-spacing watermark embedded therein. Assuming that the line spacing values of 139, 159, 158, and 140 are extracted in this order, their average Ave is calculated at 149. Using this average Ave, an average of the squares of deviations for the line spacing values is calculated; as a result, a variance V of 90.50 is obtained.

Meanwhile, there is also the case where the document input unit 101 inputs an ordinary original that does not include watermark information (where line spacing is not manipulated). FIG. 5 illustrates an example of the result of a variance obtained in such a document image that has no line-spacing watermark embedded therein. Assuming that line spacing values of 153, 152, 150, and 149 are extracted in this order, their average Ave is calculated at 151. Using this average Ave, an average of the squares of deviations for the line spacing values is calculated; as a result, a variance V of 2.50 is obtained.

As described above, in general, a variance in the line spacing values varies depending on the presence or absence of a line-spacing watermark. Specifically, the variance tends to be relatively high in the presence of a line-spacing watermark, whereas the variance tends to be relatively low in the absence of a line-spacing watermark.

In view of this, in step S206, the determination unit 105 compares the variance V calculated in step S205 with the variance threshold value A (A=50) set in step S201. If V>A (YES in step S206), it is determined in the step S207 that "watermark information is present." If V>A is not satisfied (NO in step S206), on the other hand, it is determined in step S208 that "watermark information is absent."

Note that, in the case of a document that has been copied repeatedly, there is a possibility that the characters themselves may become enlarged, that is, line spacing values may be narrowed; therefore, such a point can be taken into consideration at the time of setting the variance threshold value in step S201. In addition, in order to avoid the influence of noise, it is effective to provide not only the threshold value A but also an upper-limit threshold value.

Note that, in the present embodiment, since the line-spacing watermark information has been embedded according to the sizes of two line spaces as illustrated in FIG. 3, even though a document image that has line-spacing watermark information embedded therein is input upside down (rotated 180 degrees), the calculation result with a variance in the line spacing values is not affected. This eliminates the need to correct the inverted position of an image and allows an image to remain in its inverted position at the time of determining the presence or absence of a line-spacing watermark, in anticipation of a further increase in processing speed.

As described above, according to the present embodiment, the presence or absence of line-spacing watermark information is determined based on fluctuations in line spaces in a document image. This enables high-speed and high-precision determination of the presence or absence of line-spacing watermark information, as compared with the case where a data string of values that have been actually embedded in a document image is extracted and verified.

Accordingly, a system for switching processing to be performed on an input document depending on the presence or absence of a line-spacing watermark can perform appropriate processing at high speed, so that the processing efficiency of the entire system is improved. For example, in the case where a copying machine controls copy permission based on a line-spacing watermark, no delay occurs in the copy operation.

Note that, in the present embodiment, it is necessary at the time of extracting line spacing values in step S204 to eliminate an inappropriate value for a line-spacing watermark that may arise due to factors such as noise or a logo-type mark that does not manipulate line spacing values. As a measure for this, for example, the line extraction unit 102 and the line-spacing value extraction unit 103 perform processing such as first extracting six line spacing values, then selecting, from among those six, four line spacing values that exclude the maximum and minimum values, and transmitting the selected four line spacing values to the calculation unit 104. For example, from among six line spacing values of 200, 139, 159, 158, 140, and 140, the maximum value of 200 and the minimum value of 139 are excluded and the remaining four line spacing values, namely 159, 158, 140, and 140, are transmitted to the calculation unit 104. This allows the omission of, for example, a high line spacing value that represents a logo-type mark at the top of a document and a first line spacing value in the body and accordingly enables more accurate calculation of a variance, thus improving the reliability of the determination of the presence or absence of watermark information.

Second Embodiment

The following describes a second embodiment according to the present invention. The second embodiment is implemented as a variation of the aforementioned first embodiment. Specifically, the processing performed until the calculation of fluctuations in the initially extracted prescribed number of line spacing values is the same as in the first embodiment; however, unlike in the first embodiment, when the calculation result does not exceed the threshold value, it is not immediately determined that "a watermark is absent". In this case, according to the second embodiment, a continuous line spacing value is additionally extracted until the number of line spacing values reaches a preset number and the calculation of fluctuations is performed repeatedly; when the fluctuations become higher than the threshold value, it is determined that "a watermark is present." On the other hand, if the fluctuations do not exceed the threshold value until the number of line spacing values has reached a predetermined number, it is determined that "a watermark is absent."

The following describes the process for determining the presence or absence of a line-spacing watermark according to the second embodiment and, in particular, mainly describes the dissimilarities from the aforementioned first embodiment. Note that a document processing apparatus according to the second embodiment has the same configuration as in FIG. 1A described in the first embodiment, and a document that has a line-spacing watermark embedded therein, which is the subject of the determination, is also in the same form as illustrated in FIG. 3, so their descriptions will be omitted.

Figure 6:
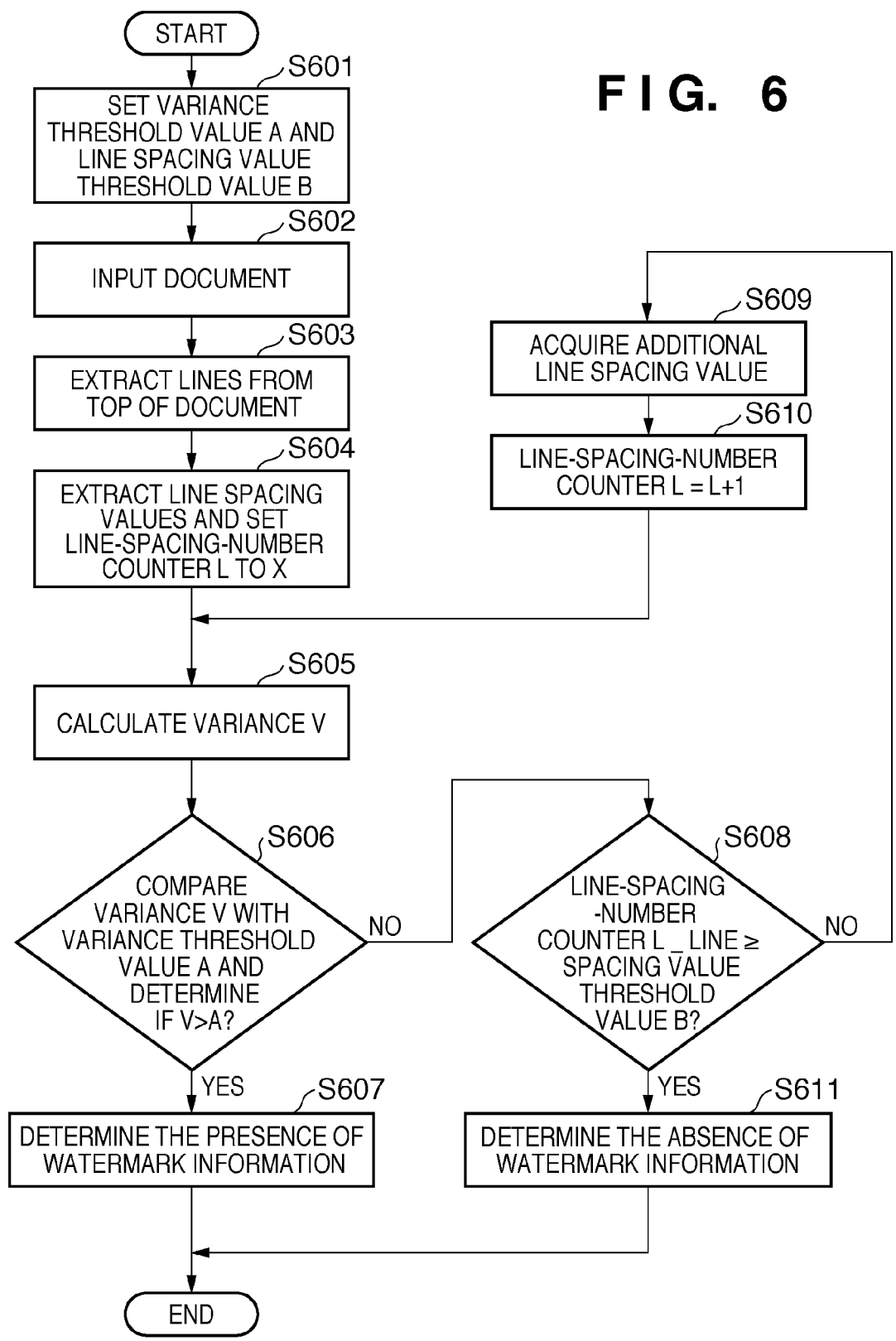
FIG. 6 is a flow chart illustrating a process for determining the presence or absence of line-spacing watermark information according to a second embodiment.

FIG. 6 is a flow chart illustrating the process for determining the presence or absence of line-spacing watermark information according to the second embodiment.

First, in step S601, the determination unit 105 sets a variance threshold value A and a line spacing threshold value B that are used to determine whether or not a document image includes watermark information. As in the first embodiment, the variance threshold value A and the line spacing threshold value B may be held in the determination unit 105; in the present example, it is assumed that A=50 and B=10.

Then, in steps S602 and S603, line portions are extracted from the input document as in steps S202 and S203 of the first embodiment.

Then, in step S604, the line-spacing value extraction unit 103 sequentially extracts line spacing values for the extracted lines. At this time, a line-spacing-number counter L is set. For example, if four line spacing values have been extracted, L is set to 4.

Then, in step S605, the calculation unit 104 calculates fluctuations in the line spacing values as in the first embodiment.

The following describes a specific example of the calculation of fluctuations according to the second embodiment. In the second embodiment, a variance is used for the calculation of fluctuations as in the first embodiment, and the following describes an example of the calculation of a variance according to the second embodiment.

FIG. 7 illustrates an example of the calculation of a variance in a document image that has a line-spacing watermark embedded therein. Also in the second embodiment, line spacing values are extracted sequentially. In the present example, since the line-spacing-number counter L shows a value of 4, first consider the case where four line spacing values of 148, 152, 147, and 153 enclosed in the bold box in FIG. 7 have been extracted sequentially. In this case, an average Ave of the four line spacing values is calculated at 150, and using this average Ave, an average of the square of the deviation of each line spacing value is calculated; as a result, a variance V1 of 6.50 is obtained.

In step S606, the determination unit 105 compares the variance V1 of 6.50 calculated in step S605 with the variance threshold value A of 50 set in step S601. In this case, since V1>A is not satisfied, the process goes to step S608.

In step S608, the line-spacing-number counter L showing a value of 4 and the line-spacing-number threshold value B of 10 are compared. In this case, since L≧B is not satisfied, the process goes to step S609.

In step S609, upon an instruction from the determination unit 105, the line extraction unit 102 additionally extracts a continuous single line and the line-spacing value extraction unit 103 extracts an additional line spacing value (153 in the example illustrated in FIG. 7). Then, in step S610, the line-spacing value extraction unit 103 increments the line-spacing-number counter L by one. That is, L=5 in this case.

The process then returns to step S605, in which the calculation unit 104 calculates fluctuations in the five line spacing values that include the line spacing value additionally extracted in step S609. Although the details will be described later, at the time of calculating a variance as the fluctuations in the five line spacing values, the average Ave of the line spacing values is not recalculated and the value that has been calculated using the previous four line spacing values is used as-is. Accordingly, as illustrated in FIG. 7, a variance V2 in the five line spacing values of 148, 152, 147, 153, and 153 is calculated at 7.0, using the average Ave of 150. Then, in step S606, the variance V2 of 7.0 is compared with the variance threshold value A of 10; since V>A is not satisfied, the processing of steps S608 to S610, S605, and S606 is repeated under the instruction of the determination unit 105.

Thereafter, when the eighth line spacing value of 145 has been processed as illustrated in FIG. 7, a variance V5 of 11.50 is calculated, in which case since V>A in step S606, the process goes to step S607 where it is determined that "watermark information is present" and the process is completed.

Note that, in step S608, if the variance V does not exceed the variance threshold value A until the number of line spacing values reaches the line spacing threshold value B of 10, the process goes to step S611 where it is determined that "watermark information is absent" and the process is completed.

Note that, in the second embodiment, after the average Ave has been calculated from the four line spacing values enclosed in the bold box in FIG. 7, even if another line spacing value is added, the average Ave is not recalculated using the additionally extracted line spacing value. This eliminates the need to recalculate a deviation or the like for those line spacing values whose deviation or the like has already been calculated, thus increasing the efficiency of sequential processing with line spacing values and accordingly contributing to an increase in speed.

While the number of line spaces to be added in step S609 has been described one at a time, it is apparent that the number of line spaces to be added is not limited to this example.

As described above, according to the second embodiment, the calculation of fluctuations is repeatedly performed by adding a line spacing value until the number of line spacing values reaches a preset value, and at the time when the fluctuations exceeds the threshold value, it is determined that "a watermark is present." Thus, even if a document has line spacing values that have been manipulated only slightly, it is possible to determine the presence or absence of watermark information at high speed and with reliability.

Accordingly, even in the case of a document that has line spacing values manipulated only slightly or the case where line spacing values are affected by the precision of an application for creating an original, a printer for outputting a paper document, or the like, the presence or absence of a watermark can be determined with reliability.

Note that, although the first and second embodiments have described the examples where the calculation unit 104 calculates a variance and the determination unit 105 compares the variance with the threshold value, the present invention is not limited thereto. For example, any value such as a deviation or a standard deviation that represents fluctuations in input values may be used instead of a variance.

Moreover, in the first and second embodiments, a target to be processed has been described as a document image that has watermark information embedded therein according to the sizes of two line spaces as illustrated in FIG. 3. However, a line-spacing watermark in a document image to be processed according to the present invention may be embedded by any other methods. For example, the present invention is applicable to any other methods for embedding watermark information by manipulating line spaces, such as defining an initial line space as a reference line space and then embedding information sequentially based on the differences of other line spaces from the reference line space.

Note that a measure to further improve performance in determining the presence or absence of a line-spacing watermark described in the first and second embodiments will be described with reference to FIG. 8A. Referring to a document image 801 illustrated in FIG. 8A, it is effective to provide two or more areas from which line spacing values are acquired, as illustrated by the arrows A and B in the sub-scanning direction, in order to have the ability to support not only an ordinary left-aligned document but also a right-aligned document, etc. Note that the "left-aligned document" as used herein refers to a document that has a character string in each line justified to the left and has a wider right margin. The "right-aligned document" is the reverse thereof.

In one conceivable example of the determination method used at that time, it is determined that "watermark information is present" when the variance(s) obtained in the case of either one or both of the arrows A and B exceed(s) the variance threshold value A; such a method, however, may be selected as appropriate according to the usage. If the presence or absence of watermark information in a right-aligned document is to be determined, an appropriate variance that indicates that "watermark information is present" can be obtained only if the variance is calculated as described above at the position of the arrow B.

Moreover, it is also effective to provide two or more areas from which line spacing values are acquired in the main scanning direction, as illustrated by the arrows A, C, and D. This enables, even in the case of a document that includes multiple columns in the vertical direction, high-precision determination of the presence or absence of a line-spacing watermark.

Figure 8B:
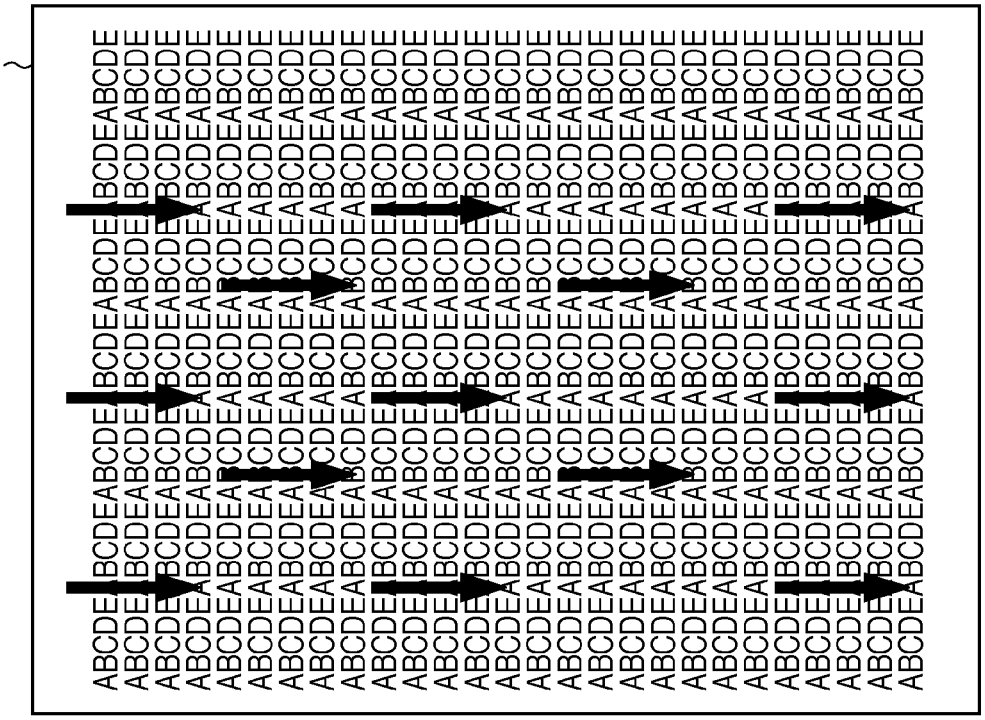
FIGS. 8A and 8B are diagrams illustrating examples in which the positions from which line spacing values are acquired are controlled on a document according to the first and second embodiments.
Figure 8A:
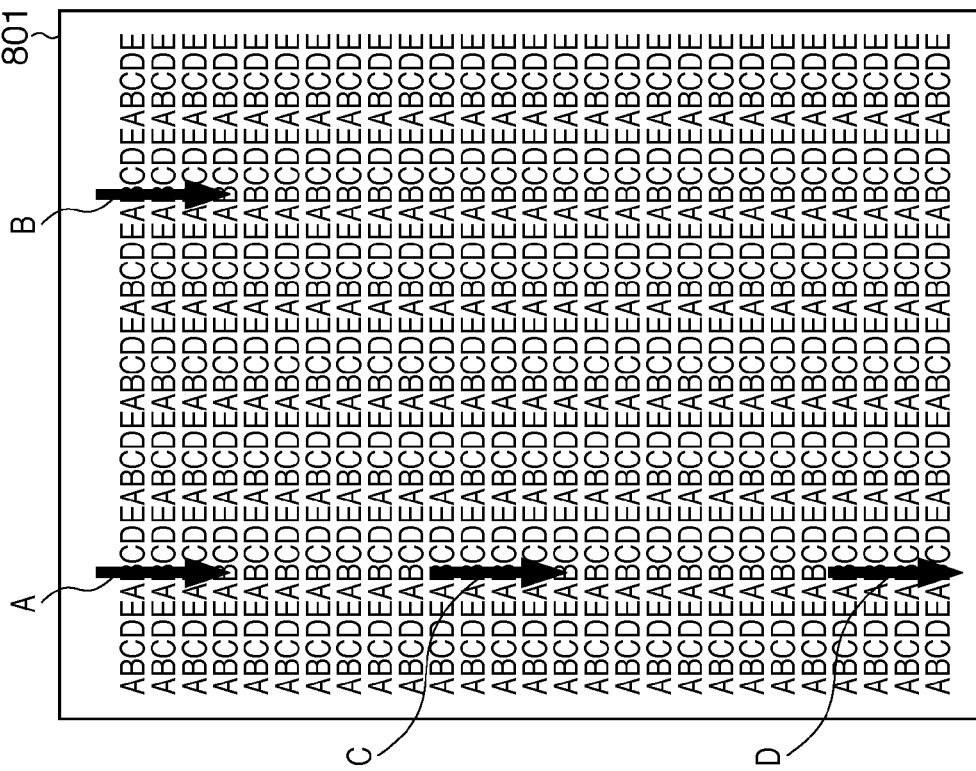

In particular, as illustrated in FIG. 8A, multiple blocks (corresponding to the arrows in the drawing) from which a variance is calculated in a document image may be located discretely in both the main scanning direction and the sub-scanning direction, which enables high-precision determination of the presence or absence of a line-spacing watermark in document images of various structures.

Moreover, as illustrated in FIG. 8B, a method in which blocks from which a variance is calculated are randomly located in a document image so as to acquire line spacing values is also effective. With such a method, even in the case of a document image whose structure is unpredictable at a user level, it is possible to determine the presence or absence of a line-spacing watermark with high precision.

Furthermore, it is also possible, by enabling a change in the number of blocks (arrows) from which the above-described variance is calculated, to increase the speed and/or precision of the process for determining either that "watermark information is present" or that "watermark information is absent". As one specific example, it can be said from a comparison between FIGS. 8A and 8B that the case of FIG. 8A is a case of high-speed and low-precision determination processing, whereas the case of FIG. 8B is a case of low-speed and high-precision determination processing. From this, the determination in the former case is referred to as a "high-speed (low-precision) determination mode," whereas the determination in the latter case is referred to as a "low-speed (high-precision) determination mode," either of which is selectable according to a user instruction.

It is sill also possible to allow each of the two modes described above to have multiple steps by further minutely setting the number of blocks (arrows) from which the aforementioned variance is calculated. More specifically, the number of parallel lines N in the main scanning direction and the number of parallel lines M in the sub-scanning direction are set as parameters that determine the number of arrows described above. Then, a user inputs those numbers N and M so that the blocks equivalent to N×M arrows are periodically located in a document image. Thereafter, a variance is calculated for each block. Then, based on the calculation result, "the presence or absence of a watermark" is determined.

Also in the case of multifunction peripherals described later or the like, such various settings may be input into and/or designated for the equipment by a user.

Third Embodiment

The present embodiment describes control by a multifunctional peripheral (MFP) that incorporates therein the document processing apparatus according to the first and second embodiments.

FIG. 1B is a block diagram illustrating a fundamental functional configuration of a document processing apparatus according to the present embodiment. In addition to the functional configuration in FIG. 1A, the configuration in FIG. 1B further includes a watermark information extraction unit 106, an MFP control unit 107, an output unit 108 such as a printer, and a display unit 109. Note that units that will not be described in the present embodiment operate according to the contents described in either the first or second embodiment.

One example of the usage of such an MFP is a security function to prevent unauthorized copying. This is a function to prevent unconditional copying by embedding watermark information in a confidential document or the like.

As a first step, a user initiates copying of a document using an MFP. Specifically, a user places a document on the document input unit 101 serving as a scanner and issues a copy instruction with the display unit 109.

The subsequent processing determines, as described in the first and second embodiments, the presence or absence of watermark information (the flow chart in FIG. 2). Here, a detailed description will be omitted, and the processing performed by the determination unit 105 after the presence or absence of watermark information has been determined will be described.

First, when the determination unit 105 has determined that "watermark information is present," the watermark information extraction unit 106 extracts watermark information from the entire document image and provides notification about the extracted watermark information to the MFP control unit 107. When having determined from the watermark information that the document is a confidential document, the MFP control unit 107 forcefully terminates copy processing. Then, the MFP control unit 107 causes the display unit 109 to display a notification such as "copy-restricted document". As another method, at the time when the determination unit 105 has determined that "watermark information is present," the MFP control unit 107 may determine that the document is a confidential document.

On the other hand, when the determination unit 105 has determined that "watermark information is absent," the watermark information extraction unit 106 provides a notification about that result to the MFP control unit 107. Thereafter, from the determination result that "watermark information is absent," the MFP control unit 107 determines that the document is not a confidential document and causes the output unit 108 to output the document image as-is that has been read by the document input unit 101. That is, copy processing is performed. The display unit 109 displays a notification such as "copy completed."

Another usage of the MFP is in tracking the leaking of information from a confidential document. Specifically, a document image of a confidential document or the like is printed that has embedded therein watermark information for tracking an information leak (for identifying the printing source) such as the date and time of printing, a person who printed the document, a person to whom information has been distributed, and the ID number of an MFP. In the case where such a confidential document has been leaked to a person outside an organization, if the document can be acquired thereafter, the determination of "the presence or absence of watermark information" according to the present invention is performed using the MFP, and if the result of the determination showed that "watermark information is present," the source of the leak can be tracked (identified) by extracting and analyzing the watermark information from the entire document. If it is possible to manage by ID numbers a series of pieces of information for use in tracking the source of a leak such as a person who printed the document, an alternative method may be embedding only such ID numbers as watermark information.

As described above, according to the third embodiment, by using the configurations described in the first and second embodiments, it is possible to speedily achieve the function of preventing unauthorized copying or the function of tracking an information leak. Specifically, it is possible to notify the display unit about the contents of control performed in outputting a document image, based on the result of the determination of the presence or absence of watermark information.

Fourth Embodiment

The following describes a fourth embodiment according to the present invention. The fourth embodiment has the feature that it causes a computer system to perform the processing described above in the first to third embodiments.

Figure 9:
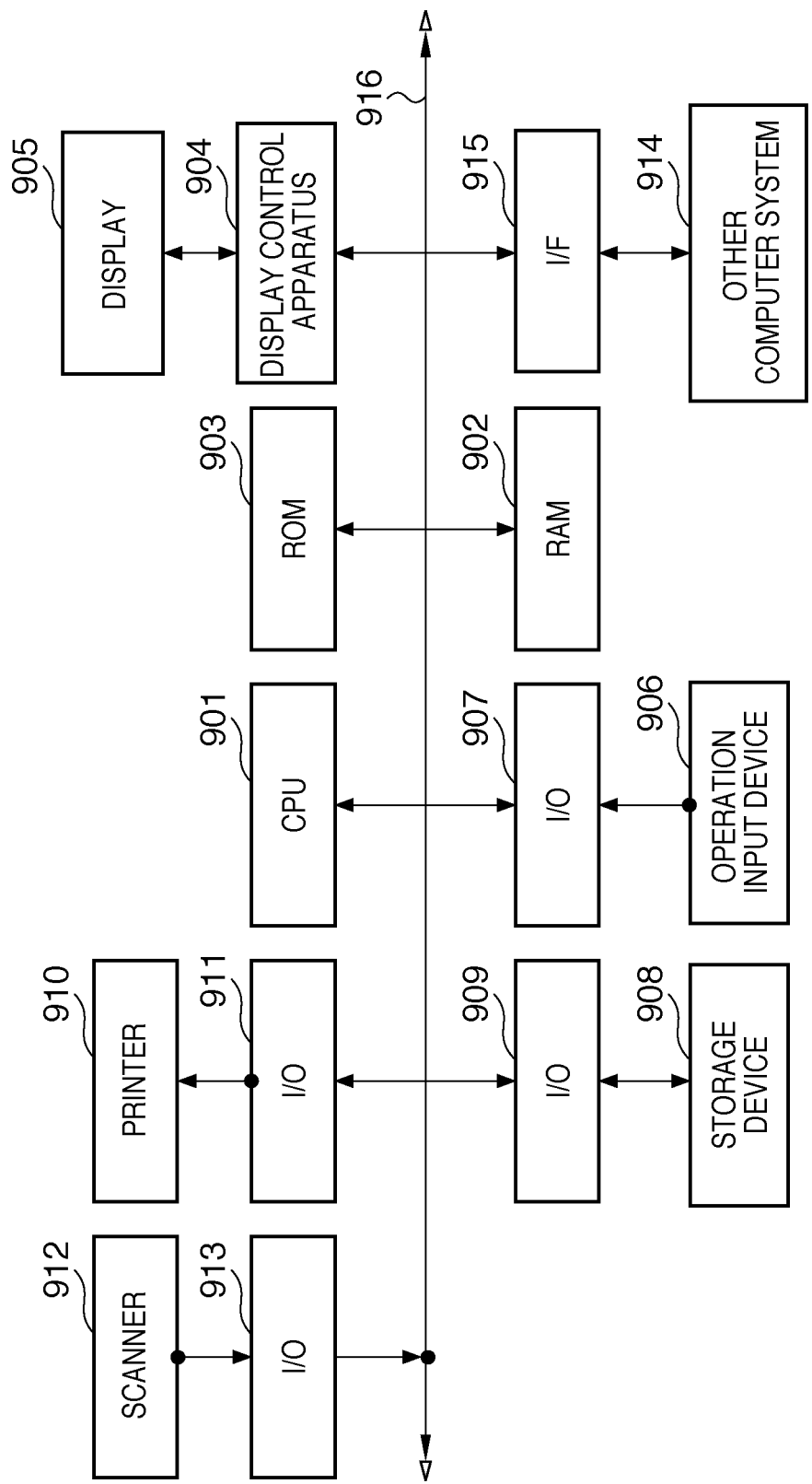
FIG. 9 is a block diagram illustrating a basic configuration of a computer system according to a fourth embodiment.

FIG. 9 is a block diagram illustrating a basic configuration of a computer system according to the fourth embodiment. In order for this computer system to execute all the functions described in the aforementioned embodiments, each functional configuration is described in a program and the computer system reads that program.

In FIG. 9, reference numeral 901 denotes a CPU that controls the entire system using programs or data stored in a RAM 902 or a ROM 903 as well as performing the processing described in the aforementioned embodiments. Reference numeral 902 denotes a RAM that includes an area in which programs or data that have been loaded from an external storage device 908 or that have been downloaded from the other computer system 914 over an I/F (interface) 915 are temporarily stored. The RAM 902 also includes a working area required for the CPU 901 to perform various processes. Reference numeral 903 denotes a ROM that stores functional programs, settings data, and the like that are used in a computer system.

Reference numeral 904 denotes a display control apparatus that performs control for causing a display 905 to display images, characters, or the like. Reference numeral 905 denotes a display that displays images, characters, or the like. Note that the display 905 may be a cathode-ray tube, a liquid crystal screen, or the like, for example. Reference numeral 906 denotes an operation input device that consists of any device such as a keyboard or a mouse that can input various user instructions into the CPU 901. Reference numeral 907 denotes an I/O that communicates various instructions or the like that have been input with the operation input device 906 to the CPU 901. Reference numeral 908 denotes an external storage device that serves as a mass storage information device such as a hard disk, and stores an OS (operating system) or programs for causing the CPU 901 to execute the processing described in the above embodiments, input and output original images, and the like. The writing of information to the external storage device 908 or the reading of information from the external storage device 908 is performed through an I/O 909.

Reference numeral 910 denotes a printer for printing and outputting a document or an image, and its output data is transmitted through an I/O 911 from the RAM 902 or the external storage device 908. Note that the printer 910 may be an inkjet printer, a laser beam printer, a thermal transfer printer, or a dot-impact printer, for example. Reference numeral 912 denotes a scanner for reading a document or an image, and its input data is transmitted through an I/O 913 to the RAM 902 or the external storage device 908. Reference numeral 916 denotes a bus that connects the CPU 901, the ROM 903, the RAM 902, the I/O 911, the I/O 909, the display control apparatus 904, the I/F 915, the I/O 907, and the I/O 913.

As described above, according to the fourth embodiment, the detection of the presence or absence of line-spacing watermark information and accordingly the watermark information detection processing described in the above first to third embodiments can be realized by a computer system.

Note that, while the fourth embodiment provides an example in which the program for realizing the functions of the above-described first to third embodiments is prepared and executed under the control of the CPU 901, some functions may be realized by a dedicated hardware circuit or the like. Such a dedicated hardware circuit may be a device such as the scanner 912 or the printer 910 that is provided in an external apparatus.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-274867 filed on Oct. 24, 2008 and No. 2009-175800 filed on Jul. 28, 2009, which are hereby incorporated by reference herein in their entirety.

What is claimed is:

1. A document processing apparatus that determines whether or not a document image has watermark information embedded therein by use of line spacing, comprising:
   an input unit adapted to input a document image;
   a line-spacing value extraction unit adapted to extract line spacing values in the document image;
   a calculation unit adapted to calculate fluctuations in the line spacing values; and
   a determination unit adapted to determine whether or not the document image has watermark information embedded therein by comparing the value of the fluctuations calculated by the calculation unit with a preset threshold value.

2. The document processing apparatus according to claim 1, wherein the determination unit determines the document image as having watermark information embedded therein when the value of the fluctuations is higher than the threshold value.

3. The document processing apparatus according to claim 1, wherein the line-spacing value extraction unit extracts a preset number of line spacing values.

4. The document processing apparatus according to claim 3, wherein the preset number of line spacing values extracted by the line-spacing value extraction unit is a multiple of two.

5. The document processing apparatus according to claim 3, wherein, when the determination unit has determined the value of the fluctuations as being lower than the threshold value, the line-spacing value extraction unit further extracts a continuous line spacing value in addition to the already extracted preset number of line spacing values.

6. The document processing apparatus according to claim 5, wherein the calculation unit recalculates the fluctuations, using the additionally extracted line spacing value in addition to the preset number of line spacing values already extracted by the line-spacing value extraction unit.

7. The document processing apparatus according to claim 6, wherein, when recalculating the fluctuations, the calculation unit uses an average of the preset number of line spacing values already extracted by the line-spacing value extraction unit.

8. The document processing apparatus according to claim 1, wherein the fluctuations are a variance in the spacing values.

9. The document processing apparatus according to claim 1, wherein the fluctuations are a deviation in the spacing values or a standard deviation in the line spacing values.

10. The document processing apparatus according to claim 1, wherein the line-spacing value extraction unit extracts, as the line spacing value, a height of a blank portion between character string lines in the document image.

11. The document processing apparatus according to claim 1, wherein the line-spacing value extraction unit extracts, as the line spacing value, a sum of a height of a character string line and a height of a blank portion between character string lines in the document image.

12. The document processing apparatus according to claim 1, further comprising:
   a control unit adapted to control an output of the document image based on a result of the determination performed by the determination unit; and
   a display unit adapted to display contents of control by the control unit.

13. The document processing apparatus according to claim 1, further comprising:
   a print unit adapted to print a document image that has, as the watermark information, watermark information for tracking an information leak embedded therein,
   wherein, when as a result of the determination performed by the determination unit, the document image that has been input by the input unit is determined as including the watermark information for tracking an information leak, the watermark information for tracking an information leak is extracted and analyzed so as to specify a source of a leak of the document image.

14. A document processing method for determining whether or not a document image has watermark information embedded therein by use of line spacing, comprising:
   an input step of inputting a document image;
   a line-spacing value extraction step of extracting line spacing values in the document image;
   a calculation step of calculating fluctuations in the line spacing values; and a determination step of determining whether or not the document image has watermark information embedded therein by comparing a value of the fluctuations calculated in the calculation step with a preset threshold value wherein the said input step, said value extraction step, said calculation step, and said determination step are executed by a document processing apparatus.

15. A non-transitory computer-readable medium storing a program executable by a computer to perform document processing for determining whether or not a document image has watermark information embedded therein by use of line spacing, the program causing the computer to execute:

an input task adapted to input a document image;

a line-spacing value extraction task adapted to extract line spacing values in the document image;

a calculation task adapted to calculate fluctuations in the line spacing values; and a determination task adapted to determine whether or not the document image has watermark information embedded therein by comparing a value of the fluctuations calculated by the calculation task with a preset threshold value.

* * * * *